United States Patent
Haney et al.

(10) Patent No.: US 6,244,183 B1
(45) Date of Patent: Jun. 12, 2001

(54) MULTIPLE PRINTING PROCESS PIN REGISTRATION METHOD AND APPARATUS

(75) Inventors: Daniel E. Haney, Mason; Matthew J. Haney, Cincinnati; Michael Poulin, Middletown; William Damon Alford, Cincinnati, all of OH (US)

(73) Assignee: Haney Graphics, Cincinnati, OH (US)

( * ) Notice: Subject to any disclaimer, the term of this patent is extended or adjusted under 35 U.S.C. 154(b) by 0 days.

(21) Appl. No.: 09/497,349

(22) Filed: Feb. 3, 2000

Related U.S. Application Data (63) Continuation-in-part of application No. 09/100,704, filed on Jun. 19, 1998, now Pat. No. 6,038,977.

(51) Int. Cl.[7] .................................................. B41F 1/10
(52) U.S. Cl. ...................... 101/490; 101/129; 101/211; 101/481; 101/485
(58) Field of Search .................................. 101/114, 129, 101/211, 483, 485, 490, DIG. 36, 481; 235/495; 283/98, 99, 100

(56) References Cited

U.S. PATENT DOCUMENTS

| | | | |
|---|---|---|---|
| 3,913,719 | 10/1975 | Frey | 101/91 |
| 4,038,123 | 7/1977 | Sammis | 101/129 |
| 4,505,497 | 3/1985 | Katzman | 101/211 |
| 4,569,584 | 2/1986 | St. John et al. | 101/151 |
| 4,584,939 | 4/1986 | Giori | 101/152 |
| 4,656,602 | 4/1987 | Berkland et al. | 364/900 |
| 4,721,969 | 1/1988 | Asano | 346/157 |
| 4,876,726 | 10/1989 | Capello et al. | 382/4 |
| 5,160,938 | 11/1992 | Fargo et al. | 346/1.1 |
| 5,315,380 | 5/1994 | Ingraham et al. | 358/500 |
| 5,416,612 | 5/1995 | Ingraham et al. | 358/501 |
| 5,434,956 | 7/1995 | Son et al. | 395/105 |
| 5,460,087 | 10/1995 | Ogorzalek | 101/128.21 |
| 5,481,655 | 1/1996 | Jacobs | 395/109 |
| 5,494,445 | 2/1996 | Sekiguchi et al. | 434/365 |
| 5,540,146 | 7/1996 | Lapp | 101/152 |
| 5,592,202 | 1/1997 | Erickson | 347/37 |
| 5,592,573 | 1/1997 | Eisenbarth et al. | 382/294 |
| 5,672,020 | 9/1997 | Leonard et al. | 400/692 |
| 5,682,191 | 10/1997 | Barrett et al. | 347/104 |
| 5,683,187 | 11/1997 | Tunmore | 400/58 |
| 5,694,853 | 12/1997 | Stempien | 101/485 |

*Primary Examiner*—Ren Yan
(74) *Attorney, Agent, or Firm*—Wood, Herron & Evans, L.L.P.

(57) ABSTRACT

A method for mounting a substrate having a first image printed thereon on a digital printer to be used to print a second image in a desired alignment with the first image, wherein the first image is printed on the substrate using a nondigital process. The first image is related to a second image to form a composite image. First, registration holes in a template are placed over registration pins on the digital printer, thereby mounting the template on the printer. The second image is printed on the template using the digital printer, and the template is then removed from the digital printer. Registration holes of substrate leaders and the registration holes of the template are placed over registration pins extending from a work surface. The substrate is then positioned with respect to the substrate leaders and the template at a desired location where the first image on the substrate aligns with the second image on the template. The substrate leader is then secured to the substrate at the desired location. The substrate leaders and the substrate secured thereto are removed from the registration pins extending from the work surface; and the registration holes in the substrate leaders are placed over the registration pins on the digital printer, thereby mounting the substrate leaders and the substrate secured thereto on the printer. The second image can then be printed by the digital printer on the substrate in alignment with the first image to produce a composite image on the substrate.

19 Claims, 4 Drawing Sheets

MULTIPLE PRINTING PROCESS PIN REGISTRATION METHOD AND APPARATUS

This application is a continuation-in-part application of U.S. Ser. No. 09/100,704 filed Jun. 19, 1998 for Multiple Printing Process Registration Method, now U.S. Pat. No. 6,038,977.

BACKGROUND OF THE INVENTION

This invention relates generally to printing processes and more particularly to an improved printer registration process.

The design of packaging for goods, principally, consumer goods, has become increasingly more complex in view of the greater number of types of packages available, the wider range of materials from which packages may be made as well as the properties of the goods to be packaged. A package design must consider how the goods are to be safely transported through distribution channels, presented to the consumer at the retail level and handled by the consumer prior to use. In addition, the package graphics or images are important in attracting the attention of the potential purchaser as well as providing the highest quality presentation of the goods to the consumer. Therefore, it is a common practice to provide high quality package "comp", that is, a color comprehensive or mock-up, of the final package so that it may be perceived as accurately as possible in its final form. Further, since the package comp is not designed for actual use, but simply to visually evaluate the package image, it is desirable to provide the highest quality images on the package material at the least cost.

It is impractical to run a small quantity of packages on the automated printing press line used to manufacture the package on a commercial scale. Therefore, most often, such comps are produced by hand. For purposes of this document, the application of interest are those package comps made of a flexible material in which printing processes that print on flexible substrates are used. Often, a drum-type, large format digital printer is used. Such a printer produces a high quality simulation of the package images.

Package comp designs often specify colors that are identified with respect to a chart of standard colors, for example, a "PANTONE" chart commercially available from Pantone Inc. of Moonachie, N.J. However, not all of those "PANTONE" colors can be reproduced or printed using the digital printer. The digital printer is only capable of printing process colors, that is, those colors that can be produced using the colors in the printer print heads which most often are cyan, magenta, yellow and black. It is generally most efficient to print all of the colors on the package comp with the digital printer, and therefore, every effort is made to provide process colors on the digital printer that match the colors specified in the package design. However, white and a number of "PANTONE" colors, for example, gold, etc., cannot be suitably matched with a process color. In those situations, line colors are used which are generally produced by mixing inks to the desired color. Therefore, in producing such a package comp, it would be desirable to use another printing process to apply the line color in combination with the digital printing process which applies the process color.

In such a process, using a computer workstation, a component or line color digital image file is produced that represents a desired line color portion of the package image, for example, a white or gold, that is not printed with the digital printer. Using that component digital image file, the line color is applied to a package substrate using a conventional printing process, such as a silk screen, printing, offset printing or a direct imaging process. The package substrate having the line color image printed with a conventional printing process must then be mounted on the digital printer with which the remainder of the package image, that is, the process color image, will be printed.

As will be appreciated, any attempts to mount the package substrate on the printer drum utilizing known alignment techniques will not result in the process color image being printed in exact alignment with the previously printed line color image. The known mounting techniques suggest that the substrate be aligned utilizing either the physical edges of the printer drum or alignment guide lines that are printed along the edges of the substrate and thus, outside the printed image itself. As will be appreciated, successfully aligning the edges of the substrate or mutually perpendicular guide lines with the printer drum on do not necessarily result in an alignment of the conventionally printed line color image with a superimposed digitally printed image. Such misalignment while not great, it is sufficient to distort the visual perception of the image on the package comp. Thus, the package comp is of insufficient quality to accurately represent the appearance of a high quality, mass produced package.

Therefore, currently, only a trial and error process can be used to mount the flexible substrate on the drum of the digital printer, and such trial and error process is time consuming, inefficient and often requires several attempts before an acceptable package comp is produced. Thus, there are no known alignment techniques for easily, efficiently and reliably mounting a conventionally printed flexible substrate on the drum of the digital printer, so that the line color image matches the process color image that is printed with the digital printer.

In addition, if a silk screening printing process is used, the silk screen may stretch slightly during the screening step; and hence, the silk screened line color image on the packaging substrate no longer matches or corresponds exactly with the component digital image file from which the silk screen was created. Further, packaging material requirements now often specify that the package be made from a material that stretches, for example, polyethylene. With a stretchable material, if the line color image is applied by a silk screening process, both the stretchable material and the silk screen are physically and unsymmetrically stretched with the screening step. Consequently, the silk screened image is even further distorted with respect to the component digital image file from which the silk screen was created.

Consequently, there is a need for an alignment or registration system by which a flexible substrate having a first image printed thereon on at a first location can be precisely mounted on a drum of a digital printer at a different location.

SUMMARY OF THE INVENTION

The present invention permits a package comp to be made in which two different images are printed on a common substrate using printing processes at different locations, that is, a first image is printed on the substrate at a first location, and thereafter, a second image is printed on the substrate with a digital printer so that the first and second images are in a desired relationship. The invention is especially valuable in that a conventional printing process, for example, a silk screen printing process, may be used to print a line color image; and thereafter, a digital printer used to print process color images in precise alignment with the silk screened line color image. Thus, the present invention has great value in being able to make use of the advantages of both conventional printing processes and digital printing processes to print related images on a common substrate. The process of the present invention further permits the use of different printing processes with a flexible and stretchable substrate.

According to the principles of the present invention and in accordance with the preferred embodiment, a method is provided for mounting a substrate having a first image printed thereon on a digital printer to be used to print a second image in a desired alignment with the first image, wherein the first image is printed on the substrate at a first location different from a location of the digital printer. The first image is related to a second image to form a composite image. First, registration holes in a template are placed over registration pins on the digital printer, thereby mounting the template on the printer. The second image is printed on the template using the digital printer, and the template is then removed from the digital printer. Registration holes of substrate leaders and the registration holes of the template are placed over registration pins extending from a work surface. The substrate is then positioned with respect to the substrate leaders and the template at a desired location where the first image on the substrate aligns with the second image on the template. The substrate leader is then secured to the substrate at the desired location. The substrate leaders and the substrate secured thereto are removed from the registration pins extending from the work surface; and the registration holes in the substrate leaders are placed over the registration pins on the digital printer, thereby mounting the substrate leaders and the substrate secured thereto on the printer. The second image can then be printed by the digital printer on the substrate in alignment with the first image to produce a composite image on the substrate.

In one aspect of the invention, the first image is printed on the substrate using a nondigital or conventional printing process, and in a further aspect of the invention, the substrate is made from a stretchable, flexible material. In another aspect of the invention, a method is provided for using the template to locate the registration pins on the digital printer and to locate the registration pins on the work surface.

In a still further embodiment of the invention, the printing of the first image on the flexible substrate is preceded by the creation of a first digital image file of the first image. Further, a second digital image file representing the second image is created and used to print of the second image on the substrate with the digital printer after the flexible substrate has been mounted on the digital printer pursuant to the above described process.

These and other objects and advantages of the present invention will become more readily apparent during the following detailed description taken in conjunction with the drawings herein.

DETAILED DESCRIPTION OF THE INVENTION

Figure 1:
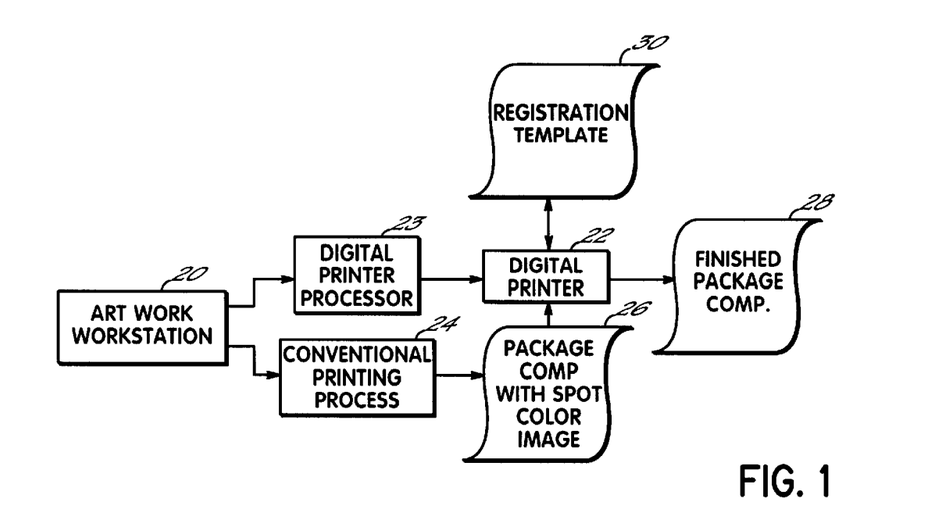
FIG. 1 is a schematic diagram of the elements utilized in the registration process in accordance with the principles of the present invention.

FIG. 1 is a schematic diagram of the elements utilized in the registration of the present invention to produce a desired finished package comp. The package comp applications of most interest are those utilizing flexible materials such as plastic sheets, metallized films and foils, etc. that may be clear, translucent or opaque and are generally 12 mils or less in thickness. Such flexible substrates must be supported during the printing processes. An artwork workstation 20 is used to create the package images to be printed on the package in a known manner. The workstation may be any type of personal computer, for example, a "MACINTOSH" 9600 commercially available from Apple Corporation of Cupertino, Calif. The image processing software in the workstation 20 may be Adobe Illustrator or Adobe Photoshop commercially available from Adobe Corporation of Mountain View, Calif. Other commercially available image processing software may also be used.

Often, the composite package image will require colors that cannot be matched to the process colors that are printed by a digital printer 22; and therefore, those line colors must be applied by a conventional printing process 24. Such a conventional printing process 24 uses different apparatus and is not integrated with the digital printer 22. The conventional printing process 24 is physically separate from, that is, at a different location from, the digital printer 22. For purposes of this document, conventional printing processes are defined as nondigital printing processes, for example, offset printing, silk screened printing, direct imaging, the DuPont WaterProofing process for printers, etc. The workstation 20 is used to produce a first, component or line color digital image file that is used with the conventional printing process 24 to produce a flexible substrate 26 having the first, component or line color image printed thereon.

As will be appreciated, the flexible substrate with the line color image 26 must then be mounted on the digital printer 22 such that the remainder of the package image can be printed thereon. The digital printer 22 includes a control or processor 23 that commands and controls the operation of the printer 22. The digital printer 22 and control 23 may be, for example, a Model 3047 drum-type, large format printer commercially available from IRIS Graphics, Inc. of Bedford, Mass. As earlier discussed, there are no known methods of providing reliable indicia such that the flexible substrate 26 can be mounted on a drum of the digital printer 22 without extensive trial and error. That trial and error process is time consuming and often requires several flexible substrates be printed before a satisfactory one is produced.

The present invention takes advantage of the capability of the digital printer 22 to reliably, repeatably and precisely print an image at the same location with respect to the printer drum time after time. Given that capability, the present invention provides a registration system in which the package comp with the line color image 26 can be easily, efficiently and reliably mounted on the drum of the digital printer 22 such that the digital printer produces a desired finished package comp 28. Thus, the digitally printed process color image on the finished package comp 28 matches as closely as possible the line color image produced by the conventional printing process 24.

With the present invention, there is no attempt to align the flexible substrate with the printer drum, but instead the line color image on the flexible substrate is aligned with a process color image printed with the digital printer. The registration process first requires that a registration template 30 be mounted on the drum of the digital printer 22. The registration template is normally a flexible substrate made of a translucent "MYLAR" polyester material. The artwork workstation 20 is used in a known manner to provide a process color digital image file, that is, a digital image file to be reproduced by the digital printer 22. The process color digital image file is provided to the printer processor 23 which causes the digital printer 22 to print the process color image on the template 30 mounted on the printer drum. Therefore, no image is printed on the template 30 in the area corresponding to the desired location of the line color image. Thereafter, the package comp with the line color image 26 is placed on the drum of the printer 22 with respect to the registration template 30. The package comp 26 may be placed over or under the registration template 30. In the latter application, one or two edges of the registration template 30 are loosened from the surface of the drum of the printer 22, and the package comp 26 is slid beneath the registration template. The package comp 26 is manipulated with respect to the registration template 30 until the line color image on the package comp 26 is precisely aligned with the process color image on the registration template 30. The package comp 26 is then secured to the drum of the printer at its aligned location. If the package comp 26 has been located underneath the registration template 30, the template 30 is then removed from the printer drum and the digital printer processor 23 is again operated to cause the process color image to be printed on the package comp 26. The digital printer 22 will print the process color image on the package comp 26 in precisely the same location at which it printed the process color image on the registration template 30. Therefore, a finished package comp 28 is produced in which the process color image and the line color image are precisely aligned.

To utilize the registration template 30 with other package comps 26, upon initially mounting the registration template 30 on the drum of the printer 22, registration indicia are marked both on the registration template 30 and the drum of the printer 22. Thus, after the template 30 has been removed, the registration indicia on the template 30 and the drum of the printer 22 may be used to remount the registration template 30 on the drum of the printer 22 in precisely the same location. Thus, the same registration template 30 may be used for any number of package comps 26. The above process provides an easy, inexpensive, efficient and repeatable process for mounting a flexible material having a first image printed at a first location on the drum of a digital printer at a second location, thereby permitting the printer to print a second image in alignment with the first image.

Figure 2:
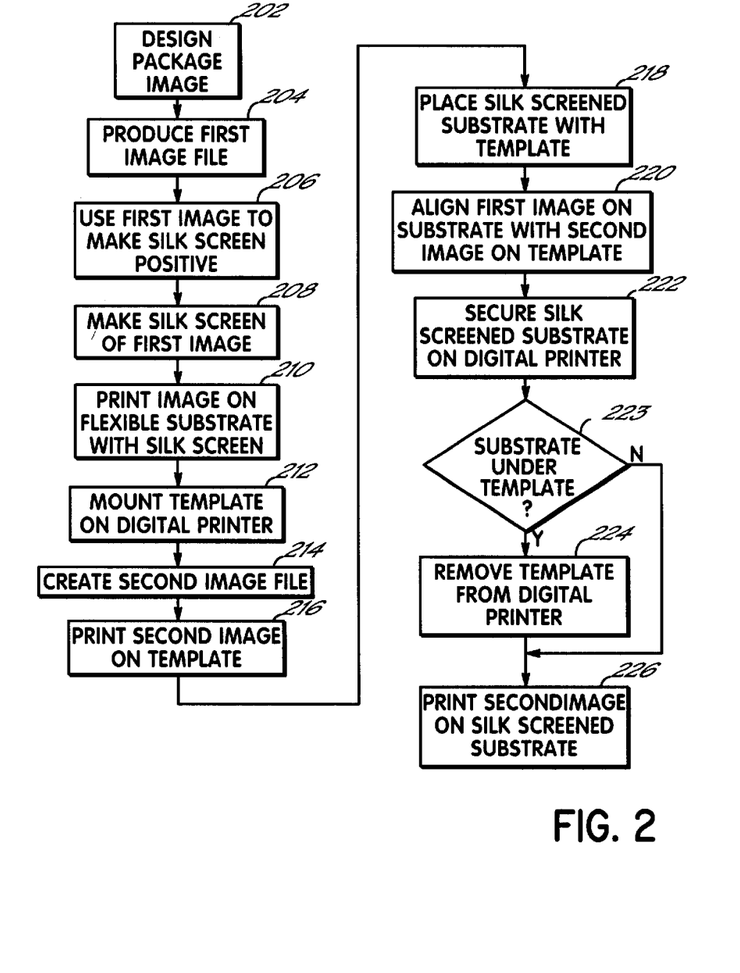
FIG. 2 is a flowchart illustrating in more detail one embodiment of the registration process in accordance with the principles of the present invention.

FIG. 2 is a schematic diagram illustrating in more detail the registration process of the present invention. First, at 202, the artwork workstation 20 (FIG. 1) is used to create the package image. In the production of packaging comps, it is very desirable to be able to combine digital printing with the conventional silk screen printing process. Silk screen printing requires a minimal investment, is relatively simple, fast and can be used over a wide range of line colors. However, silk screen printing is a manual process that does not have the same precision and repeatability as a digital printing process. Thus, the concept of matching an imprecise, silk screened image on the same substrate with a very precise digitally printed image to produce a high quality composite package image would be rejected by most people who are knowledgeable and skilled in the printing arts.

Therefore, at 204, the artwork workstation is used to create a first, component or line color digital image file which is to be used by the conventional printing process 24 to print the line color on the flexible substrate. In a known manner, the line color image is trapped and removed from the package digital image file. As part of the trapping process, the line color image may be slightly expanded or reduced so that there is a proper fit of the digital printed image onto the silk screen image. The size of the overlap, the colors to be used in the overlap and the direction of the overlap will vary depending on the nature of the image itself, the colors involved and the process. Thus, the specifications for the trapping process are generally based on the experience of the individual and their particular preferences.

As shown at 206 in FIG. 2, the first step of the silk screening process is to use the first, line color digital image file to make a silk screen positive. Commercially available image setters can be purchased from Agfa, DuPont and others for this purpose. An image setter exposes an emulsion to light, for example, laser light, over an area defined by the line color image. Next, at 208, the silk screen positive is treated with a processor that chemically washes all emulsion from the positive except the exposed area of the emulsion, that is, the area of the line color image. Thereafter, the positive is exposed to ultraviolet light and the area on the silk screen outside of the exposed emulsion area hardens leaving the unexposed area porous.

At 210, the silk screen is then used to print the first, line color image on the flexible substrate. During the silk screen printing process, an ink spreader is drawn over the silk screen with a positive pressure, thereby forcing ink through the silk screen over the area represented by the line color image. During the drawing step, the silk screen experiences a slight stretch in the direction of the draw down. While the magnitude of the stretch is small, it will vary over the silk screen in the direction of the silk screen draw. Consequently, the line color image printed on the flexible substrate differs from and does not correspond with the image represented by the line color digital image file in the computer. Further, the variation of the silk screen image from the desired line color image is unsymmetrical, nonpredictable with precision and nonrepeatable. As will be appreciated, any attempts to mount the silk screened substrate on the drum of the digital printer and thereafter, print the process color image on the flexible substrate so that it precisely matches the line color image would be extraordinarily difficult. Not only does the silk screened image differ from the desired line color image in the computer, but the process of locating the flexible substrate on the printer drum is fundamentally a time consuming, inefficient and wasteful trial and error process. Consequently, the ability to utilize conventional and digital printing processes in combination to provide a high quality package comp is extraordinarily difficult and expensive.

With the present invention, at 212 of FIG. 2, a registration template, preferably made of a translucent "Mylar" polyester material is mounted on the drum of the digital printer in a normal manner. For example, the template is taped to the drum at several locations along each of the four template edges. Thereafter, at 216, the digital printer processor 23 is utilized to operate the printer 22 to print the second, process color image on the registration template. Thus, there is no printing on the template over the area of the line color image. Next, at 218, the packaging comp with the line color image 26 is placed with the registration template 30 on the drum of the printer 22. The nature of the relationship between the silk screen substrate 26 and the registration template 30 will depend on the particular package image.

In some applications, the package requires that the flexible image substrate be an opaque material, for example, a metallized film, and therefore, it is preferable that the registration template 30 be translucent and placed over the substrate 26. In those applications, the tape holding down one or more edges of the template 30 is cut at the edge of the template, thereby permitting the edges of the template 30 to be lifted from the drum. The flexible substrate 26 is then slid beneath the template 30 and over the drum of the printer 22. The substrate 26 is manipulated to a location at which the line color image on the substrate 26 aligns precisely with the process color image printed on the registration template 30. Thereafter, at 222, the silk screened substrate is secured by tape to the drum of the printer 22, and at 224, the registration template 30 is removed from the digital printer 22.

In other applications, the packaging image may require a translucent or transparent flexible packaging material. In that case, at step 218 of FIG. 2, the silk screened substrate 26 is placed over the registration template 30, and at 220, the substrate 26 is manipulated until the line color image is precisely aligned with the process color image on the template 30. Then, at 222, the substrate 26 is taped to the printer drum.

In both of the applications described above, the process ends with the printer processor 23 being activated to cause the digital printer 22 to print the second, process color image on the flexible substrate 26 that has been mounted to the drum of the printer 22. Since the digital printer has the characteristic of being able to repeatably print the same image at precisely the same location on the drum of the printer 22, the process color image will be printed on the silk screen flexible substrate 26 at precisely the same position that it was printed on the flexible substrate 30. Consequently, a finished package comp 28 is produced in which the line color image is precisely aligned with the process color image.

The above process has the further advantage of not only permitting a digital printing process to be combined with a conventional printing process to produce a finished package image, but further, the registration process permits a package comp to be made from a stretchable and flexible substrate. The stretchable substrate presents further problems with respect to the conventional silk screening process, not only will the drawing pressure distort the silk screen itself and thus, the silk screen image, but the drawing process will also distort the stretchable substrate. Further, such distortion is unsymmetrical and unpredictable. Consequently, line colors that are silk screened onto a flexible and stretchable substrate are different with each substrate and even more difficult to mount on the drum of a digital printer absent the registration process of the present invention.

A further problem exists when using a nonstandard printing stock, for example, polyethylene, with a digital printing process that is primarily designed to print on a paper based stock. The ink from the digital printer will not normally adhere to the chroma treated or dyne side of the polyethylene. Normally, the ink simply breaks into microscopic bubbles and spreads over a large area of the polyethylene substrate, thereby seeming to disappear. To overcome that problem, the polyethylene is treated with a commercial ink jet receiver. However, prior to the ink jet receiver, the polyethylene is coated with a laquer to etch the surface, thereby providing a bonding surface for the ink jet receiver. Coating the polyethylene with laquer presents its own problems in that the edges of the polyethylene tend to buckle and warp and curl over the sheet itself. Such a curled sheet is difficult, if not impossible, to easily work with in the subsequent process steps. Therefore, to provide peripheral support for the polyethylene sheet during the coating processes, a strip of adhesive tape is applied as a border to the lower surface of the polyethylene sheet.

While the above-described process is very useful and effective for aligning a substrate with a conventionally printed image on the drum of a digital printer for subsequent printing, the process does have certain disadvantages. First, the cylindrical nature of the digital printer drum is awkward to control during the alignment process. Further, for larger or multiple images, given the rotational motion of the drum, it is difficult to maintain the entire image within a single field of view during the alignment process. In addition, the requirement of performing the alignment of the imaged substrate on the printer drum removes the printer from production, thereby reducing its efficiency and productivity. Consequently, a process by which the imaged substrate can be aligned with the printed template off of the printer drum represents a substantial improvement to the aforementioned process.

To overcome the above disadvantages, an alternative embodiment of the invention to be described utilizes a pin registration system in which the alignment of the substrate with the registration template is done off of the digital printer. Pin registration systems are widely used in the printing industry and available from many sources, for example, registration pins manufactured by Stoesser are commercially available from the Pitman Company of Dayton, Ohio. Stoesser also manufactures a hole punch that produces registration holes in sheet material that are sized to properly accept the registration pins, and such a hole punch is also commercially available from the Pitman Company.

Figure 5:
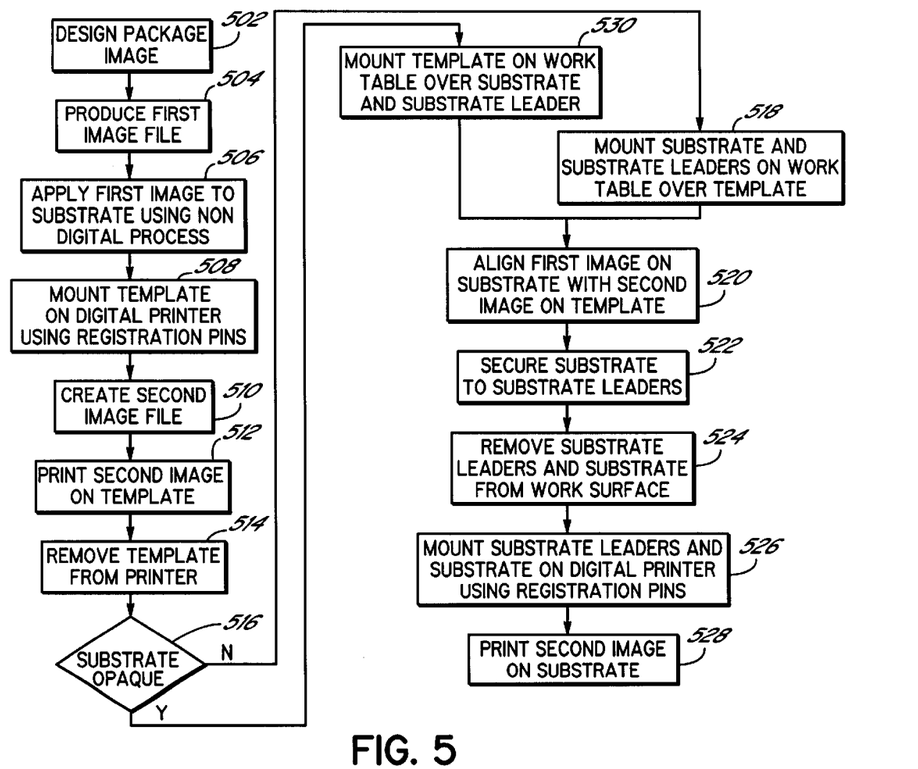
FIG. 5 is a flowchart illustrating in more detail the alternative embodiment of the registration process.

Referring to FIG. 5, the initial portion of the alternative embodiment, at 502–506, is substantially identical to the process previously described with respect to FIG. 2, at 202–210, by which a first image is printed on a substrate using a conventional nondigital process. Thereafter, at 508, a translucent or transparent registration template is mounted on the drum of the digital printer 22 using registration pins.

Figure 6:
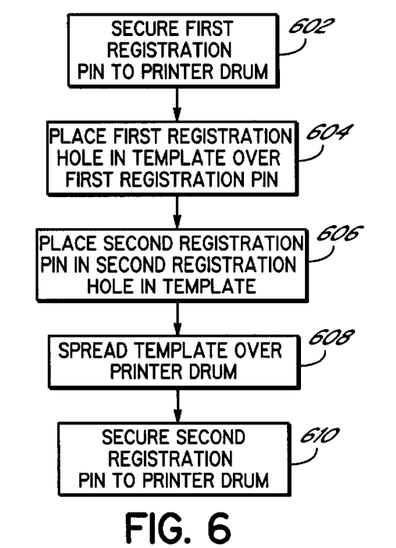
FIG. 6 is a flowchart illustrating the details of a further process of locating registration pins on the printer drum in accordance with the principles of the alternative embodiment of the invention.

For any particular substrate being made, the registration pins must initially be located on the printer drum. Referring to FIG. 6, at 602, and FIG. 3, that first registration pin location process is begun by mounting a first registration pin 32 to a drum 34 of the digital printer 22, for example, by a strip of tape 33. Registration holes 36 have been previously punched into the registration template 30, and at 604, one of the registration holes 36 is placed over the first registration pin 32. A second registration pin 38, at 606, is placed in one of the registration holes 39, and thereafter, at 608, the registration template 30 is spread smoothly over the cylindrical surface 35 of the drum 34. The second registration pin 38 is then, at 610, secured to the drum 34, for example, by a strip of tape 40.

Figure 3:
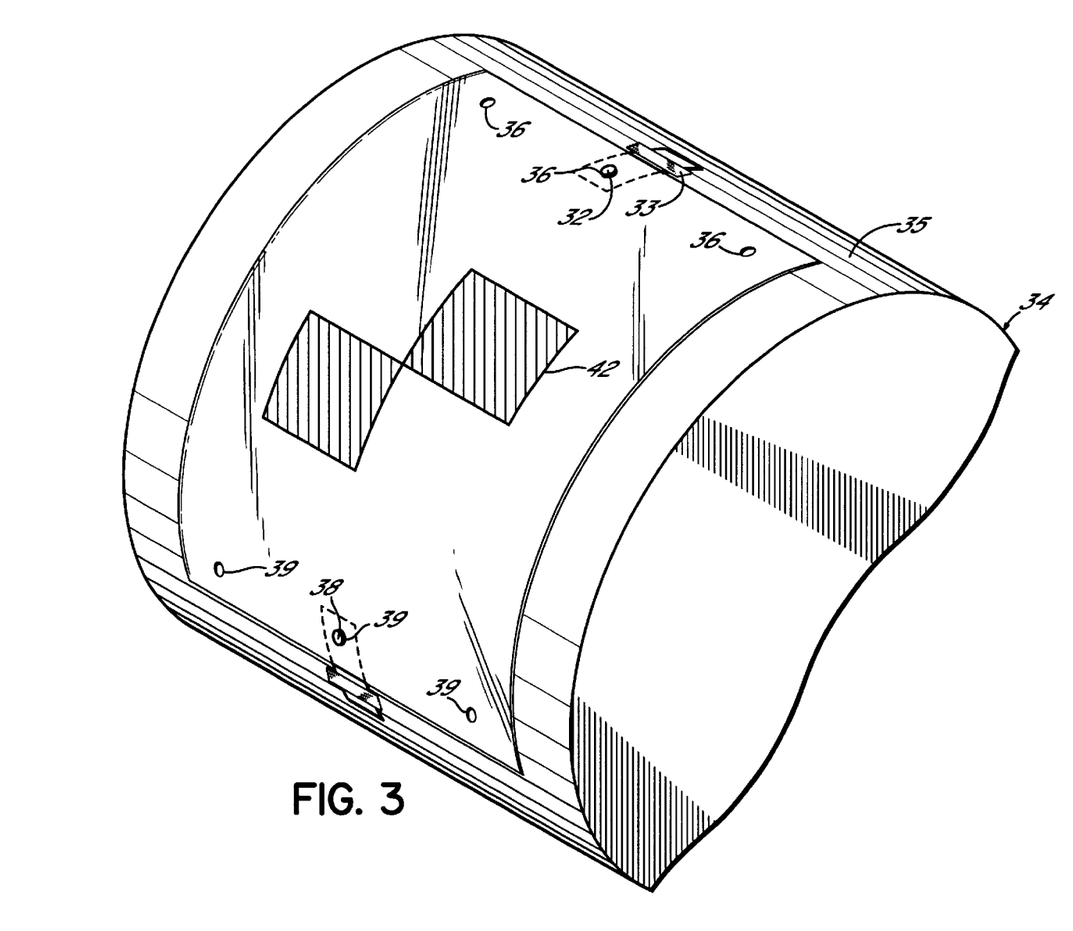
FIG. 3 is a partial perspective view of a drum of a digital printer and the registration pins in accordance with the principles of an alternative embodiment of the invention.

As will be appreciated, when the print drum 34 is rotated to print an image on the template 30, the pins 32, 38 move past printheads (not shown). Therefore, the pins 32, 38 must have a length such that they do not contact the printheads when the drum 34 is rotating, and the commercially available registration pins 32, 38 are often ground to a length so that they fit into a clearance space between the rotating drum 34 and the printheads providing the image 42.

A second image file is then created, at 510 of FIG. 5, in a manner as previously described with respect to FIG. 2 at 214. Thereafter, at 512, the digital printer is operated to print an image 42 on the registration template 30. The template 30 is thereafter, removed from the drum 34, at 514, by lifting the registration holes 36, 39 off of the registration pins 32, 38. The registration pins 32, 38 are left secured to the printer drum 34.

Figure 4:
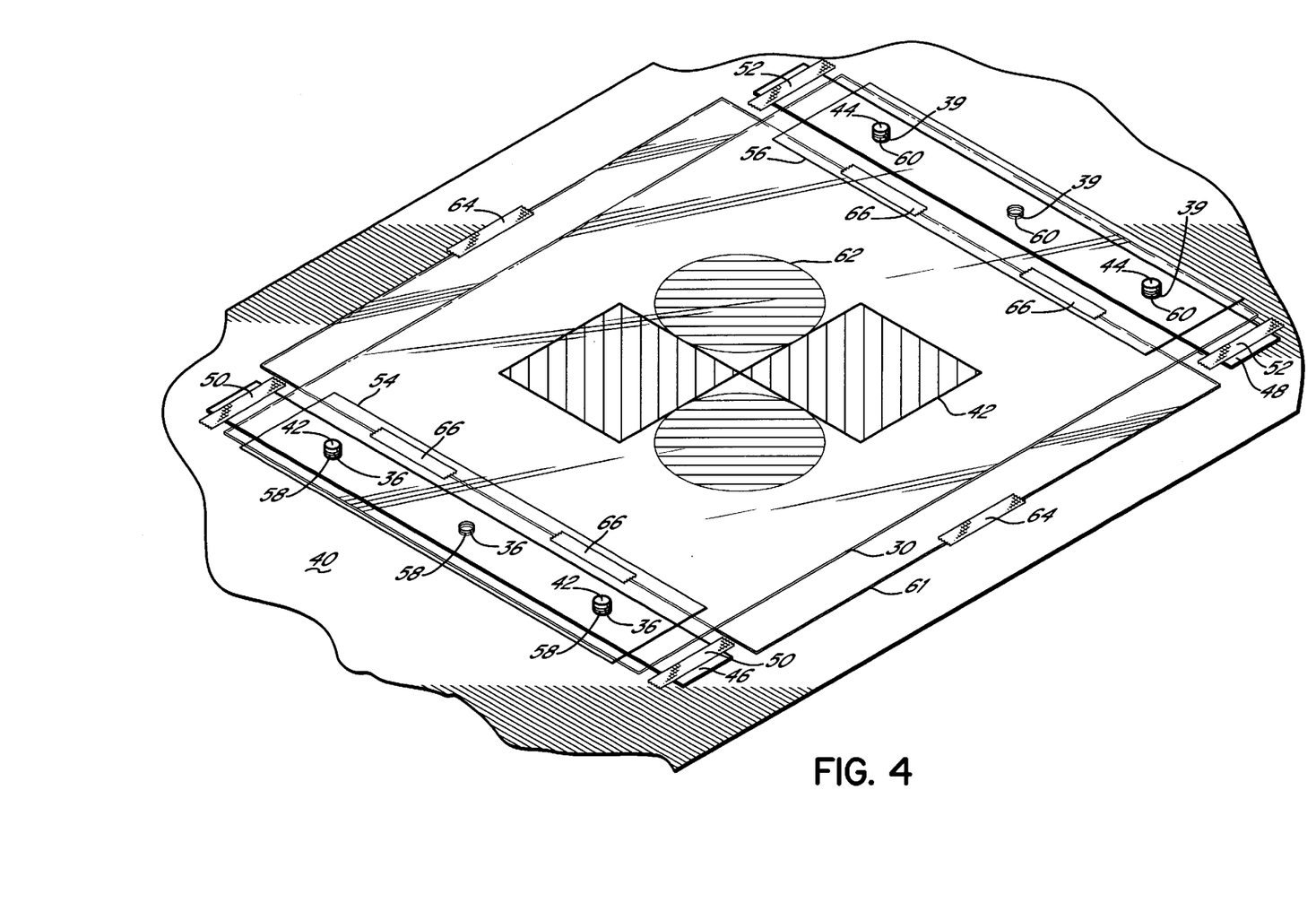
FIG. 4 is a perspective view of a work surface having registration pins used in the alternative embodiment of the invention.

Thereafter, referring to FIGS. 4 and 5, the registration template 30 is moved to a work surface 40 which is normally a horizontal surface and is, for example, the top surface of a working table. The work surface 40 is the surface on which the registration template is aligned with the substrate; and again, a registration pin system is utilized. Pins 42, 44 are respectively one or more pins; and often, the pins 42, 44 are mounted on respective bases 46, 48.

Figure 7:
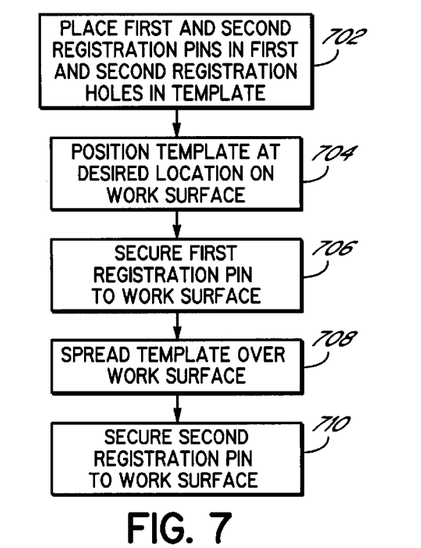
FIG. 7 is a flowchart illustrating the details of a further process of locating registration pins on the work surface in accordance with the principles of the alternative embodiment of the invention.

The pins 42, 44 are initially located on the work surface 40 utilizing the process of FIG. 7. In that process, at 702, the pins 42, 44 are placed in respective mounting holes 36, 39 of the registration template 30. At 704, the registration template is manually positioned at a desired location on the work surface 40. Then, at 706, a first base, for example, a base 46 with supporting pins 42, is secured to the working table surface 40, for example, by means of a tape strip 50. The registration template 30 is then, at 708, spread smoothly over the work surface 40; and at 710, a base 48 with supporting pins 44 is secured to the work surface, for example, with a tape strip 52. At this point, the pins 42, 44 are separated by a desired lineal distance equal to the lineal distance separating the pins 32, 38 on the drum 34 (FIG. 3).

Next, referring to FIGS. 4 and 5, at 516, the layering of the registration template and the substrate may be varied depending on whether the substrate is made from an opaque or translucent material. The more general process that is applicable to substrates that are both opaque and translucent is first described. With that process, after initially locating the pins 42, 44 on the work surface 40, the template 30 is removed from the pins 42, 44; and at 518, registration holes 58, 60 that have been punched into substrate leaders 54, 56 are first placed over the registration pins 42, 44, respectively. The substrate 61 is then positioned with respect to the substrate leaders 54, 56. Normally, the substrate 61 is simply placed on top of the substrate leaders 54, 56. However, the substrate 61 may also be placed beneath the substrate leaders 54, 56. Next the registration holes 36, 39 of the template 30 are placed over the registration pins 42, 44 so that it is on top of the substrate 61.

The substrate 61, at 520, is manually manipulated with respect to the registration template 30 until the first image 62 on the substrate 61 is precisely aligned with the second image 42 on the registration template 30. As can be appreciated, manipulating the substrate 61 to align the images 42, 62, is substantially physically simpler to perform on a flat horizontal work surface 40 than on the cylindrical surface 35 of the rotating drum 34. Further, by utilizing the flat, horizontal work surface 40, the entirety of the images 42, 62 can be maintained in a single field of vision and the images 42, 62 precisely aligned even if the images 42, 62 are large. In addition, even though the alignment process is not particularly complicated or time consuming, by performing the process on the work surface 40, the printer 22 is free for other production purposes and need not be taken out of production for the alignment operation.

After the image 62 on the substrate 61 is precisely aligned with the image 42 on the registration template 30, the substrate is temporarily secured to the work surface 40, for example, by tape strips 64. Thereafter, the registration template 30 is lifted off of the registration pins 42,44; and at 522, the substrate 61 is secured to the substrate leaders 54, 56, for example, by tape strips 66. After securing the substrate 61 to the substrate leaders 54, 56, the tape strips 64 securing the substrate 61 to the table 40 are removed; and if desired, the side edges of the assembly of the substrate leaders 54, 56 and the substrate 61 may be trimmed. At 524, the assembly of the substrate leaders 54, 56 and the substrate 61 are removed from the registration pins 42, 44; and at 526, the registration holes 58, 60 in the substrate leaders 54, 56 are mounted on the registration pins 32, 38 (FIG. 3) of the drum 34 of the printer 22. Thereafter, at 528, the printer is operated to print the second image 42 onto the substrate 61. The alignment process described above guarantees that the second image 42 will be printed in precise alignment with the first image 62 on the substrate 61.

The above registration process by which the normally translucent registration template is placed over the substrate 61, is suitable for all situations regardless of whether the substrate 61 is translucent or opaque. As will be appreciated, the process may be varied if, at 516, it is determined that the substrate 61 is a translucent material. In that situation, at 530, the template 30 can be mounted below the substrate 61 on the working table 40. In that application, referring to FIG. 7, after the second registration base 48 is secured to the work surface 40, at 710, the registration template 30 is left in place. Thereafter, the substrate leaders 54, 56 are mounted on the registration pins 42, 44 as previously described, but on top of the registration template 30. The substrate 61 is then positioned with respect to the substrate leaders 54, 56. Thus, the translucent substrate 61 is positioned over the registration template 30 either on top of, or below, the substrate leaders 54, 56. The process is then executed as previously described, at 520-528, with minor variations. In this application, after the first image 62 on the substrate 61 is precisely aligned with the second image 42 on the registration template 30, the substrate leaders 54, 56 are immediately secured to the substrate 61, for example, by tape strips 66. Thus, the interim securing of the substrate 61 to the work surface 40 utilizing tape strips 64 need not be required.

The above registration processes described herein utilize two important principles. First, obtaining the desired alignment between two images printed at different locations is best achieved by aligning the images themselves versus attempting to identify the precise location on a printer drum at which to mount the substrate having the first image. Second, a digital printer will, time after time, accurately reproduce the same image at the same location on the drum of the printer with no perceptible deviation. Therefore, first printing the second image on a template and then aligning the first image on the substrate with the second image on the template, permits the substrate to be mounted at a location at which the digital printer will reprint the second image at the desired location with respect to the first image.

Thus, the present invention has the advantage of using a relatively less precise and expensive, but fast and effective conventional printing process, for example, a silk screening process, to print a wide range of line color images in combination with a very precise and repeatable digital printer for printing the process color images. The result is a high quality package image on a package comp that closely resembles a package that would be printed on printing equipment that is used to produce the consumer packaging.

While the invention has been illustrated by the description of one embodiment and while the embodiment has been described in considerable detail, there is no intention to restrict nor in any way limit the scope of the appended claims to such detail. Additional advantages and modifications will readily appear to those who are skilled in the art. For example, while the example of FIG. 2 describes the use of a silk screening process, other conventional printing processes, for example, offset printing and direct imaging processes may be used. The registration template 30 is described as being translucent or transparent, however, as will be appreciated, if the substrate is translucent or transparent, the processes described herein may be practiced with a template made from an opaque material.

Further, the description recites using only a single substrate; however, as will be appreciated, multiple substrates may be used. In this example, a registration template 30 is longer so that images for two packages are printed on the template 30. The only limitation on the length of the template 30 is the capacity of the printer drum 34. The images may be for the same package comp or for a different package comp. The template 30 is then used to initially position the bars 46,48 on the work surface 40. The substrate leaders are then mounted on the registration pins 42, 44, and the two substrates are placed with respect to the substrate leaders and the template in a manner as previously described. The image on the substrate is aligned with its respective image on the template, and the substrate is secured to the work surface 40 with tape. The alignment and securing process is repeated for the second substrate. The template 30 is removed, if necessary, and the two substrates are then secured to adjacent substrate leaders with tape as previously described. If the substrates overlap, they are secured together with tape; or if they do not overlap, they are secured with tape to an interconnecting piece similar to one of the substrate leaders. Any number of substrates may be connected together that are capable of fitting on the printer drum 34.

Therefore, the invention in its broadest aspects is not limited to the specific details shown and described. Consequently, departures may be made from the details described herein without departing from the spirit and scope of the claims which follow.

What is claimed is:

1. A method of mounting a substrate having a first image printed thereon on a digital printer to be used to print a second image in a desired alignment with the first image, the first image being printed on the substrate at first location different from a location of the digital printer, the first image being related to a second image to form a composite image, the method comprising:

placing registration holes in a template over registration pins on the digital printer, thereby mounting the template on the printer;

printing one of the second image and the composite image on the template using the digital printer;

removing the template from the digital printer;

placing registration holes of substrate leaders and registration holes of the template over registration pins extending from a work surface;

positioning the substrate with respect to the substrate leaders and the template at a desired location where the first image on the substrate aligns with the second image on the template;

securing the substrate leader to the substrate at the desired location;

removing the substrate leaders and the substrate secured thereto from the registration pins extending from the work surface; and placing the registration holes in the substrate leaders over the registration pins on the digital printer, thereby mounting the substrate leaders and the substrate secured thereto on the printer, whereby the second image may be printed by the digital printer on the substrate in alignment with the first image to produce a composite image on the substrate.

2. The method of claim 1 further comprising securing the registration pins on the work surface at a spacing corresponding to the spacing of the registration pins on the digital printer.

3. The method of claim 1 further comprising:

securing a first registration pin to a surface of the digital printer;

placing a first registration hole in the template over the first registration pin;

placing a second registration pin in a second registration hole in the template;

spreading the template smoothly over the surface of the printer; and securing the second registration pin to the surface of the printer.

4. The method of claim 1 further comprising:

placing first and second registration pins into first and second registration holes in the template;

placing the template and the first and second registration pins at a desired location on the work surface; and securing the first and second registration pins to the work surface at the desired location.

5. The method of claim 4 wherein the substrate is a translucent material and the method further comprising:

placing the registration holes of the substrate leaders over the first and second pins secured to the work surface and over the template; and positioning the substrate with respect to the substrate leaders.

6. The method of claim 4 wherein the template is a translucent material further comprising:

removing the template from the first and second pins secured to the work surface;

placing the registration holes of the substrate leaders over the first and second pins secured to the work surface;

positioning the substrate with respect to the substrate leaders; and placing the registration holes of the template over the first and second registration pins secured to the work surface.

7. The method of claim 6 further comprising placing the substrate over the substrate leaders.

8. The method of claim 6 further comprising placing the substrate under the substrate leaders.

9. A method of mounting a flexible substrate having a first image printed thereon on a digital printer to be used to print a second image in a desired alignment with the first image, the flexible substrate having a first image printed thereon by a nondigital process, the first image being related to a second image to form a composite image, the method comprising:

placing registration holes in a template over registration pins on the digital printer, thereby mounting the template on the printer;

printing one of the second image and the composite image on the template using the digital printer;

removing the template from the digital printer;

placing registration holes of substrate leaders and registration holes of the template over registration pins extending from a work surface;

positioning the flexible substrate with respect to the substrate leaders and the template;

aligning the first image on the substrate with the one of the second image and the composite image printed on the template;

securing the substrate to the substrate leaders at a location where the first image on the substrate aligns with the one of the second image and the composite image on the template;

removing the substrate leaders and the substrate secured thereto from the registration pins extending from the work surface; and placing the registration holes in the substrate leaders over the registration pins on the digital printer, thereby mounting the substrate leaders and the substrate secured thereto on the printer, whereby the second image may be printed by the digital printer on the flexible substrate in alignment with the first image to produce a composite image on the substrate.

10. A method of mounting a stretchable, flexible substrate having a first image printed thereon on a digital printer to be used to print a second image in a desired alignment with the first image, the stretchable flexible substrate having a first image printed thereon by a nondigital process that produces a first image on a stretched flexible substrate, the first image being related to a second image to form a composite image, the method comprising:

placing registration holes in a template over registration pins on the digital printer, thereby mounting the template on the printer;

printing one of the second image and the composite image on the template using the digital printer;

removing the template from the digital printer;

placing registration holes of substrate leaders and registration holes of the template over registration pins extending from a work surface;

positioning the flexible, stretchable substrate with respect to the substrate leaders and the template;

aligning the first image on the substrate with the one of the second image and the composite image printed on the template;

securing the substrate to the substrate leaders at a location where the first image on the substrate aligns with the one of the second image and the composite image on the template;

removing the substrate leaders and the substrate secured thereto from the registration pins extending from the work surface; and placing the registration holes in the substrate leaders over the registration pins on the digital printer, thereby mounting the substrate leaders and the substrate secured thereto on the printer, whereby the second image may be printed by the digital printer on the flexible, stretchable substrate in alignment with the first image to produce a composite image on the substrate.

11. A method of printing first and second images on a flexible substrate using successive nondigital printing and digital printing processes, the method comprising:

producing a first image on the flexible substrate using a nondigital process;

mounting a template on a drum of a digital printer using registration pins;

printing a second image on the template with the digital printer;

placing registration holes of substrate leaders and registration holes of the template over registration pins extending from a work surface;

positioning the flexible substrate with respect to the substrate leaders and the template at a desired location where the first image on the flexible substrate aligns with the second image on the template;

securing the substrate leader to the flexible substrate at the desired location;

removing the substrate leaders and the flexible substrate secured thereto from the registration pins extending from the work surface;

placing the registration holes in the substrate leaders over the registration pins on the drum of the digital printer, thereby mounting the substrate leaders and the flexible substrate secured thereto on the printer; and printing the second image on the flexible substrate using the digital printer, whereby the first and second images are aligned.

12. The method of claim 11 wherein the template is a translucent material and the method further comprising:

placing the registration holes of the substrate leaders over the registration pins extending from the work surface;

positioning the flexible substrate with respect to the substrate leaders; and placing the registration holes of the template over the registration pins extending from the work surface and over the flexible substrate.

13. The method of claim 11 wherein the flexible substrate is a translucent material further comprising:

placing the registration holes of the template over the registration pins extending from the work surface;

placing the registration holes of the substrate leaders over the registration pins extending from the work surface; and positioning the flexible substrate with respect to the substrate leaders and over the template.

14. A method of printing first and second images on a stretchable, flexible substrate using successive nondigital printing and digital printing processes, the method comprising:

printing a first image on the stretchable, flexible substrate using a silk screening process causing the stretchable, flexible substrate to stretch during printing process;

mounting a template on a drum of a digital printer using registration pins;

printing a second image on the template with the digital printer;

placing registration holes of substrate leaders and registration holes of the template over registration pins extending from a work surface;

positioning the stretched, flexible substrate with respect to the substrate leaders and the template at a desired location where the first image on the substrate aligns with the second image on the template;

securing the substrate leader to the stretched, flexible substrate at the desired location;

removing the substrate leaders and the stretched, flexible substrate secured thereto from the registration pins extending from the work surface;

placing the registration holes in the substrate leaders over the registration pins on the drum of the digital printer, thereby mounting the substrate leaders and the stretched, flexible substrate secured thereto on the printer; and printing the second image on the stretched, flexible substrate using the digital printer, whereby the first and second images are aligned.

15. A method of printing first and second images on a flexible substrate using a first a nondigital process and subsequently a digital printing process, the method comprising:

creating a first digital image file representing only the first image;

producing the first image on the flexible substrate with the first process in response to the first digital image file;

creating a second digital image file representing only the second image;

mounting registration holes in a template over registration pins on a drum of a digital printer;

printing the second image on the template using the digital printer in response to the second digital image file;

removing the template from the drum of the digital printer;

placing registration holes of substrate leaders and registration holes of the template over registration pins extending from a work surface;

positioning the flexible substrate with respect to the substrate leaders and the template at a desired location where the first image on the flexible substrate aligns with the second image on the template;

securing the substrate leader to the flexible substrate at the desired location;

removing the substrate leaders and the substrate secured thereto from the registration pins extending from the work surface; and mounting the registration holes in the substrate leaders over the registration pins on the drum of the digital printer printing the second image on the flexible substrate using the digital printer in response to the second image file, thereby producing a composite image on the flexible substrate in which the first image and second images are aligned.

16. A method of printing first and second images on a flexible substrate using successive silk screening and digital printing processes, the method comprising:

creating a composite digital image file including the first and second images;

creating a first digital image file representing only the first image;

producing a silk screen positive of the first image with the first digital image;

producing a silk screen of the first image using the silk screen positive;

printing a first image on the flexible substrate using the silk screen, the first image differing in some dimension from the first image represented by the first digital image file;

mounting registration holes in a template over registration pins on a drum of a digital printer;

creating a second digital image file representing only the second image;

printing the second image on the template using the digital printer in response to the second digital image file;

removing the template from the drum of the digital printer;

placing registration holes of substrate leaders and registration holes of the template over registration pins extending from a work surface;

positioning the flexible substrate with respect to the substrate leaders and the template at a desired location where the first image on the flexible substrate aligns with the second image on the template;

securing the substrate leader to the flexible substrate at the desired location;

removing the substrate leaders and the substrate secured thereto from the registration pins extending from the work surface; and mounting the registration holes in the substrate leaders over the registration pins on the drum of the digital printer printing the second image on the flexible substrate using the digital printer in response to the second image file, thereby producing a composite image on the flexible substrate in which the first image and second images are aligned.

17. A method of printing first and second images on a stretchable flexible substrate using successive silk screening and digital printing processes, the method comprising:

creating a composite digital image file including the first and second images;

creating a first digital image file representing only the first image;

producing a silk screen positive of the first image with the first digital image;

producing a silk screen of the first image using the silk screen positive;

printing the first image on the stretchable flexible substrate using the silk screen to provide a first image on a stretched flexible substrate, the first image differing in some dimension from the first image represented by the first digital image file;

mounting a template on a drum of a digital printer using registration pins;

creating a second digital image file representing only the second image;

printing a second image on the template with the digital printer;

placing registration holes of substrate leaders and registration holes of the template over registration pins extending from a work surface;

positioning the stretched, flexible substrate with respect to the substrate leaders and the template at a desired location where the first image on the substrate aligns with the second image on the template;

securing the substrate leader to the stretched, flexible substrate at the desired location;

removing the substrate leaders and the stretched, flexible substrate secured thereto from the registration pins extending from the work surface;

placing the registration holes in the substrate leaders over the registration pins on the drum of the digital printer, thereby mounting the substrate leaders and the stretched, flexible substrate secured thereto on the printer; and printing the second image on the stretched, flexible substrate using the digital printer, whereby the first and second images are aligned.

18. An apparatus comprising:

a digital printer at a first location and having a rotatable drum;

two registration pins secured to a surface of the drum a desired distance apart;

a work surface off of the printer;

two registration pins secured to the work surface at the desired distance apart;

a flexible template having a first image and registration holes sized to receive the registration pins and separated by the desired distance, thereby permitting the flexible template to be placed on both the registration pins on the drum of the digital printer and registration pins on the work surface;

a flexible substrate having a second image; and substrate leaders, each of the substrate leaders having registration holes sized to fit over the registration pins, the substrate leaders being connected to the substrate after aligning the first and second images on the work surface, thereby permitting the substrate to be mounted on the drum of the digital printer so that the first image can be printed on the substrate in alignment with the second image.

19. The apparatus of claim 18 wherein the work surface is a substantially flat horizontal surface.

* * * * *